United States Patent [19]
de Graffenried

[11] 3,906,268
[45] Sept. 16, 1975

[54] HIGH DENSITY FLUX MAGNETIC CIRCUIT
[75] Inventor: Albert L. de Graffenried, Glen Head, N.Y.
[73] Assignee: Photocircuits Division of Kollmorgen Corporation, Glen Cove, N.Y.
[22] Filed: Apr. 8, 1974
[21] Appl. No.: 459,222

Related U.S. Application Data
[62] Division of Ser. No. 147,824, May 28, 1971.

[52] U.S. Cl. .............................. 310/154; 310/266
[51] Int. Cl.² ....................................... H02K 21/28
[58] Field of Search ............ 310/159, 156, 152, 266

[56] References Cited
UNITED STATES PATENTS
3,334,254   8/1967   Kober .................................. 310/156
FOREIGN PATENTS OR APPLICATIONS
1,174,418   7/1964   Germany ............................ 310/154

OTHER PUBLICATIONS
"Permanent Magnet DC Motor", *IBM Tech. Manual,* Fisher & Hu, Vol. 10, No. 8, 1/68.

*Primary Examiner*—Donovan F. Duggan
*Attorney, Agent, or Firm*—Morgan, Finnegan, Pine, Foley & Lee

[57] ABSTRACT

Magnetic means and circuits for efficiently conducting and directing flux to a flux emergent surface, such as the pole of a motor pole piece, in which flux produced by two or more permanent magnetic sources matched in reluctance to a working air gap is directed through surfaces of a volume of magnetically permeable material significantly greater in area than the area of the working air gap, with the flux from at least two sources having a vector component perpendicular to the average direction of the resultant flux across the working air gap.

10 Claims, 12 Drawing Figures

PATENTED SEP 16 1975

INVENTOR
ALBERT L. DEGRAFFENRIED
BY
Morgan, Finnegan, Durham & Pine
ATTORNEYS

INVENTOR
ALBERT L. DEGRAFFENRIED
BY
Morgan, Finnegan, Durham & Pine
ATTORNEYS

INVENTOR
ALBERT L. DEGRAFFENRIED
BY
Morgan, Finnegan, Durham & Pine
ATTORNEYS

HIGH DENSITY FLUX MAGNETIC CIRCUIT

This is a division of application Ser. No. 147,824, filed May 28, 1971.

BACKGROUND OF THE INVENTION

This invention relates to a magnetic means and circuits of improved efficiency and, in particular, to a magnetic circuit for reducing leakage flux conducted through magnetically permeable material.

In all magnetic circuits which include sources of magnetomotive forces (mmf), e.g., electromagnets and permanent magnets, it is recognized that a certain leakage flux will occur. Leakage flux may take several forms and is dependent on many factors, including the geometry of a magnetically conductive member (as, for example, portions of a motor stator), the influence of magnetic fields external to the field of interest, the strength of the magnetic field, and the proximity of magnetically-conducting materials to the field. In the case of motors, flux loss is commonly encountered at the sides of the poles and also in the vicinity of the stator winding or permanent magnet. In the motor, it is desirable, of course, to transfer as nearly as possible all the flux from the magnetic source across the face of the pole, the air gap, the rotor and thence to the opposite pole or flux return path. Any flux which does not follow that path, i.e. leakage flux, is not available to interact with the current in the armature and, therefore, the available torque of the motor is directly related to the efficiency of flux transfer between the source and the air gap. The same considerations apply to other electromagnetic equipment, such as moving armature relays and electrochemical actuators and transducers.

In order to obtain better flux density in the magnetic circuits of motors and other electromagnetic equipment, certain expedients have been employed. For example, since the poles and pole pieces of conventional motors having larger numbers of poles generally taper radially inwardly, the areas of the pole faces adjacent the rotor are considerably smaller than the radially outward surfaces of the pole pieces, so that the flux density increases nearer the rotor. By and large, flux leakage from the pole pieces has been compensated by increasing the strength of the magnetic field or by magnetically shielding the poles from any closely spaced magnetically permeable material which otherwise would tend to aggravate the leakage problem.

Magnetic shielding involves the addition of low permeability parts, which consume space, and is not effective, in itself, to all generation of unusually high magnetic flux densities. Yet other expedients have been to change the geometry of the pole piece so that its external surfaces are shaped so as not to be conducive to the establishment of intense leakage-inducing mmf field concentrations.

In one known stator assembly for a two-pole electric motor, improved magnetic flux density at the air gap could be obtained by mounting a pair of high-strength magnets on two obtusely angled, flat surfaces of the pole piece near the stator periphery, although the purpose of this particular construction apparently is simply to obtain more flux lines at the large face of a radially thin pole piece. The polar axes of these magnets intersect the axis of rotation of the motor so that the magnets, in that respect, bear a conventional relationship to the motor structure. That is, as is conventional in this type of motor, the polar axes of all independent magnetic sources (e.g., field coils) are generally located on radii through the axis of rotor rotation. In this particular assembly, however, the structure is somewhat different in that two independent mmf sources share a common pole piece. There is thus a tendency of the magnetic flux lines to realign along some median axis of the pole piece. However, a substantial amount of leakage occurs at sides of the pole piece which are not shielded in any way. Furthermore, because the angle is large between the surfaces of the pole piece covered by the permanent field magnets, very little surface area convergence is present and it is therefore difficult to obtain intensification of the flux density at the working air gap.

Thus, although motors of the foregoing design could be effective in improving the magnetic flux transfer from the mmf source to the rotor, substantial flux leakage still occurs, flux density amplification at the working air gap is severely restricted and the design requires a considerable amount of peripheral surface area upon which to mount the mmf field sources. Oftentimes, the motor geometry does not allow for the bulkiness of this arrangement.

Even in those prior art devices having an acceptable efficiency of magnetic transfer in the magnetic stator circuit, there nevertheless is a limit on the absolute field strength that can be achieved, owing to the degree of flux loss from the magnetically conducting pole element. In the present invention, flux loss is diminished and, as will appear later, the magnetic field density can be increased to values exceeding the flux density of the usual single mmf source to achieve flux densities in excess of 20,000 gauss. Further, the invention gives an arrangement by which the efficiency of lower cost devices can be enhanced, simply and cheaply. Thus, the invention enables the use of smaller (and cheaper) magnetic sources for any desired flux density, as well as providing means for achieving remarkably high usuable flux densities in magnetic and electromagnetic devices.

From the viewpoint of magnetic circuit design, use of magnetic circuits according to the invention affords the assumption of zero flux loss due to leakage from the magnetically conducting volume. No loss factor, therefore, need be accounted for or determined.

SUMMARY OF THE INVENTION

The foregoing advantages are attained by a magnetic means which includes a magnetically permeable unit that is driven by an *mmf* source covering a portion of the unit's surface which provides a magnetic field (s) having plural polar axes extending in different directions, more than one of which has a component perpendicular to the average direction of the resultant magnetic field vector at the working gap. In preferred embodiments of the invention, the ratio of the surface area covered by a magnetic source to the working air gap area is greater than about 1.5, usually 2.0 or more. By "covered" is meant the location of the *mmf* source to drive flux into the magnetically permeable material, the surface traversed by the flux from the source being thus covered.

An *mmf* source may include independent (discrete or infinitesimal) segments having mean polar axes which intersect at one or more points internally of the magnetically permeable unit, and these axes may also be generally normal to the unit's surfaces. Thus, it should be understood that a single physical mmf source can be considered as multiple sources where the flux (magnetization) of the source has plural directions and, in such case, the polar axes of the flux from the source would be effective to set up at least two magnetic field vectors having components normal to the resultant field.

In a more general context, the invention may be considered to involve the mutual interaction between independent mmf sources, such that resultant magnetic field vector at the working air gap of a magnetically conducting volume assumes a desired direction while the individual *mmf* sources are arranged substantially to preclude the emergence of magnetic flux from all but the working air gap surface. Under the effect, then, of the total magneto-motive force, the net flux gradient vector becomes substantially parallel to the desired axis of the flux emission from the system, with any deviant (leakage) flux vectors that otherwise would exist being essentially neutralized by the opposing flux vector components from the mmf sources.

In all cases, it is preferable that the reluctance of the mmf sources be matched to the load reluctance, i.e., the reluctance of the flux path, for best flux transfer and optimum realization of magnetic efficiency. Seen from this viewpoint, the invention may be considered to involve the arranging of directional flux from mmf sources to oppose or avoid leakage flux in the magnetic circuit, with the reluctance of each source being generally equal to the reluctance of the load driven thereby.

In the environment of hyper-performance electrical motors, the invention may be implemented by a pole piece having angularly related side surfaces, portions of at least two of which are surrounded by magnetic sources providing magnetic field vectors having components normal to the flux across the rotor air gap. The area surrounded by such sources, e.g., permanent magnet slabs, is generally at least 1.5 times greater than the air gap surface area.

Also, the invention may be implemented by using an mmf source (or sources) providing at least three magnetic field directions which intersect. Configurations of this type may be expected to come under the general case, and preferably result in substantially surrounding the entire side surface area (excluding the rotor air gap) of the pole piece.

BRIEF DESCRIPTION OF THE DRAWINGS

For a better appreciation of the scope and content of the invention, together with the further advantages and objects thereof, reference may be made to the following detailed description of preferred embodiments and to the drawings, in which.

DETAILED DESCRIPTION OF PREFERRED EMBODIMENTS

Figure 1:
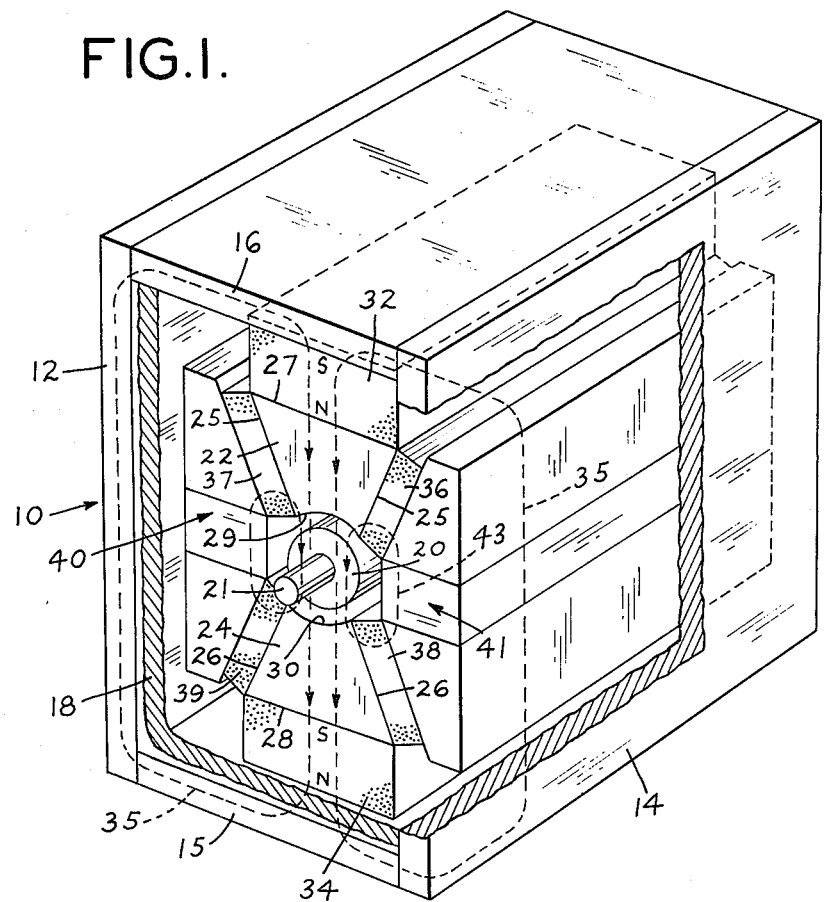
FIG. 1 is a partially cut-away perspective view of an electric motor employing magnetic stator circuits according to the invention.

FIG. 1 represents a motor embodying a high efficiency, high flux density magnetic stator circuit for obtaining extremely strong magnetic flux densities across the rotor air gap and, thereby, a motor yielding exceptionally high torques for any given armature current. For purposes of explanation, the motor may be assumed to be of the direct current type, although it should be understood that the invention and the principles which it incorporates are not limited to any particular electromagnetic device and are not limited to motor circuits, having general application to all types of magnetic circuits and electromagnetic devices.

The direct current motor in FIG. 1 is shown as a simple twopole rotating armature motor encased in a housing 10 comprised of vertical flux return plates 12, 14, horizontal flux return plates 15, 16 and magnetically conducting end bells 18, all of which may be steel. (For clarity, many details of the motor not related to the invention have been omitted, including assembly hardware, armature detail and wiring.). The armature 20 rotating on a shaft 21 journalled in the housing 10 may be assumed to be of any conventional design, rotating in the space defined between the two salient magnetically conductive pole pieces 22, 24. Preferably, these pole pieces, since the motor is to operate at extremely high flux densities, are constructed of a material having a high flux saturation value, such as C-1018 annealed ferromagnetic alloy.

Poles 22, 24 have opposite sides 25, 26, respectively, which converge radially inwardly, a flat peripheral side surface, 27, 28, respectively, and a free, pole face surface 29, 30, respectively, traversed by high density flux that interacts with the rotating armature. The air gap is defined between the armature 20 and the pole faces 29, 30 and may be referred to generally as the working air gap (as distinguished from the gaps associated with other free surfaces of the pole or magnetically conductive unit). In practice, the air gap may be on the order of a few hundredths of an inch in high performance motors and is thus greatly exaggerated on the drawings for purpose of clarity.

Contacting substantially the entire surface at the outer periphery of 27, 28 of each pole piece is a main field magnet 32, 34 which establishes the magnetic field linking the flux pole pieces, the armature, the vertical flux return plates 12, 14 and the top and bottom flux return plates 15, 16. Typical magnetic flux paths for these magnets are indicated by the endless dashed lines 35. Suitable magnets for the mmf sources 32, 34 are Alnico No. 8-B magnetic blocks having their northsouth (N-S) poles arranged in the fashion illustrated.

The motor elements thus far enumerated constitute a generally conventional d.c. motor in which the flux density is magnified by the convergence of the sides 25, 26 of the soft iron pole pieces. That is, since the surface area of the pole faces 29, 30 is significantly less than the area of the surfaces 27, 28 in contact with the main magnets 32, 34, the number of flux lines per unit area crossing the pole faces is greater than the corresponding number of flux lines per unit area crossing the interface between the field magnets and the pole pieces.

In conventional motors, the maximum achievable flux density across the air gap is limited considerably by the degree of flux loss from the pole pieces and also flux loss from magnetic paths outside the armature. Thus, flux losses may occur from the convergent sides 25, 26 to the armature surfaces and also from those sides directly to the ferromagnetic housing material, and this loss represents a limitation on the magnetic efficiency of the motor circuit. It is flux loss of that type which the present invention is effective in greatly reducing.

In accordance with the invention, the magnetic source or sources driving the working air gap are arranged, relative to the magnetically permeable material of the pole pieces, to cause substantially all the magnetic flux lines to traverse the pole faces 29, 30, thus confining the flux to the desired region of the magnetic circuit. Specifically, this result is obtained by arranging the magnetic axes of the sources to have components of the flux field in quadrature with the desired resultant flux direction.

In the motor circuit of FIG. 1, this is accomplished by the auxiliary cross-field magnets 36, 37, 38 and 39 adjacent to sides 25, 26 of the pole pieces. These magnets 36–39 have mean polar axes which intersect the mean polar axes of the main field magnets 32, 40 internally of the pole pieces and thus have axes components perpendicular to the exssentially radially inward direction of flux across the rotor air gap. Fundamentally, the magnetic axes of the magnets 36–39 are aligned in such a way to counteract the emergence of leakage flux from the primary magnets 32, 34. The magnetic fields from the auxiliary magnets thus react with the magnetic field from the main magnets to result in a substantial increase in the flux emanating from the pole faces. (In this connection, although the pole faces may be considered as flux emergent surfaces at one pole, the corresponding surface constitutes a flux entrant surface for flux emerging from the other pole.) The effect of the auxiliary magnets may theoretically be considered as a rotation or reorientation of the magnetic domains within each pole piece due to the main magnet alone.

Since the cross-field mmf sources 36–39 are considerably angled relative to the normal magnetic path of the poles, additional magnetically conductive material is provided for the cross-field flux. Soft iron flux return blocks 40, 41, each of which can be segmented for convenient assembly, are provided to link magnetically the side magnets 36–39. Thus separate magnetic circuits are established which share the magnetic paths through the pole pieces and combine to enhance the flux density at the pole faces. Use of the low reluctance return paths for the cross-field magnets permits smaller magnets to be used, while achieving the correct (preferably matched) mmf at the load (primarily the air gap) and the magnet. Typical magnetic flux paths for the auxiliary cross-field magnets are represented by the broken line loops 43.

At this juncture it should be remarked that the main magnets together with the auxiliary magnets, or cross-field magnets, surround substantially the entire exterior side surfaces of the pole pieces, except for the pole faces adjacent the rotor air gap. This is one of the features of the invention which accounts for the remarkable reduction in flux leakage because the fields are all arranged to oppose flux loss. Moreover, further leakage reduction can be achieved by utilizing magnetic source material at the ends of the pole piece as well, thereby covering the entire surface area of the pole except for the working air gap and approaching the ideal case wherein no leakage flux can occur because of opposition in every direction by opposing magnetic fields.

Another important aspect of the invention is the mutual relationship of the axes of the mmf sources surrounding the pole pieces. In particular, these axes preferably are geometrically arranged to intersect internally of the magnetically conducting pole piece unit and, in any event, have a component normal to the resultant flux, which is generally everywhere parallel to radii emanating from the motor's rotational axis. Each of the mmf sources 32, 34 and 36–39 accordingly contributes to the toal flux within the pole pieces, or cores, 22, 24, but portions of such source(s) are arranged to oppose flux exiting from the locations other than the desired areas of the magnetic circuit. Each such portion is substantially matched in reluctance to its load reluctance as reflected to it through the magnetic circuit.

Figure 3:
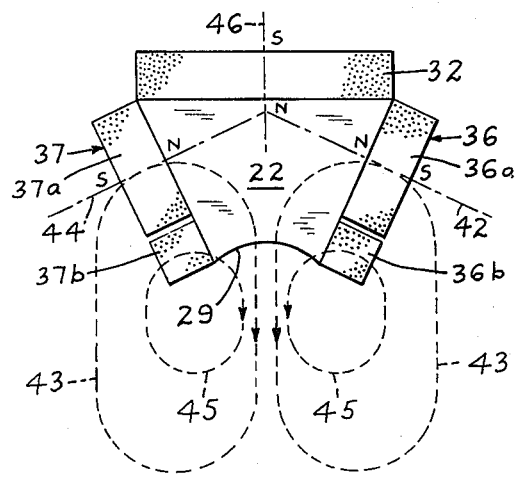
FIG. 3 is a simplified side elevation view of a stator pole assembly of the type used in the motor in FIG. 1.

FIG. 3 illustrates the general geometric relationship quite clearly, where the mean polar axes 42, 44 of the cross-field magnets 36, 37 intersect the mean polar axis 46 of the main field magnet 32. ("Mean polar axis" as used herein should be taken to designate any line at the center of the mmf source parallel to the average direction of the flux lines of the mmf field unaffected by exterior fields or materials. The mean polar axis of a bar magnet, for example, is that axis parallel to the longitudinal axis of the bar and joining the N and S poles.)

FIG. 3 illustrates also a further alternative arrangement in accordance with the invention, in which the cross-field magnets are constituted of plural segments, e.g., the segments 36a and 36b on one side of the pole piece, and the segments 37a and 37b on the other side. The segments nearer the flux emergent surface 29 preferably have a higher field strength than those segments farther from the surface 29. By selecting the cross-field magnets to have a higher flux density yield in regions in which both the flux density attributable to the main magnets and the magnetic path reluctance are greater, the cross-fields may be made more effective and, further, the cost of utilizing extremely high-strength magnets for the entire cross-field *mmf* can be avoided. In FIG. 3, typical paths for flux originating from the small high strength sources 36b, 37b are indicated by closed path loops 45 which have the pole piece 22 and its face 29 in common with the flux paths 43 and 35.

Suitable materials for the cross-field magnets include Indox VI-A, Indox V, Barium Ferrite V, and similar magnets. The particular choice of magnet will depend upon the field strength required to match the mmf drop across the air gap for the particular geometry selected. In general, magnetic circuits according to the invention are designed by choosing the desired mmf at the flux emergent surface, selecting at least one magnetic field source (e.g., the main magnet) and matching its reluctance to that of the load (e.g., primarily the reluctance of the air gap), and design can be carried out under the generally accurate assumption that no or little leakage flux is present. The cross-field magnet strength may be determined from the required mmf drop of the gap, and its reluctance preferably is closely matched to its share of the load reluctance, as well. From the foregoing parameters and the fixed dimensional limitations, the length (thickness) of the magnets, the side surface areas and the angle of convergence of the sides of the pole pieces can be calculated.

Reluctance matching enhances the usefulness of the above concepts. As already explained, flux transfer across the air gap supplied by a matched primary mmf source coupled to the gap by a soft iron piece may be improved by the addition of auxiliary magnets located at the "cheeks" (sides) of the iron piece. However, the addition of other mmf sources to the magnetic circuit results in the mismatch of the primary source and the load unless the reluctance of the primary source is adjusted. If the auxiliary magnets make no contribution to the gap flux, then the reluctance of the main magnet will approximate the reluctance of the gap. When both the main and cross-field magnets contribute flux to the gap, however, design of the circuit should take such contribution into account. The use of plural matched mmf sources, each arranged to contribute flux to a common load and to oppose leakage flux, may be regarded as another aspect of the invention.

Figure 6:
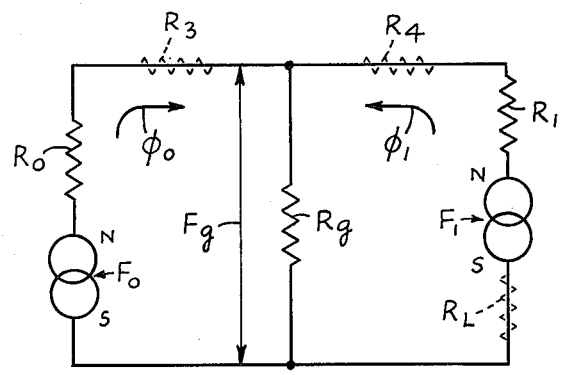
FIG. 6 is a schematic diagram of a typical magnetic circuit embodying the invention.

FIG. 6 represents a simplified equivalent magnetic circuit of the invention, where $F_0$ and $F_1$ designate the open circuit *mmf*'s of the primary source and one auxiliary magnetic source, each provided with flux return paths through soft iron pieces. The symbols $R_0$ and $R_1$ designate the Thevenin internal reluctances of the sources, $R_3$ and $R_4$ the lumped reluctances of the magnetic flux paths through the iron and $R_L$ the flux path reluctance outside the iron, excluding the air gap reluctance. It is assumed that flux leakage is combatted by the auxiliary source $F_1$ and, therefore, the load reluctance is primarily the reluctance of the air gap, $R_g$, and the leakage reluctance $R_L$ can be ignored. The high permeability of the iron permits disregarding the iron reluctances $R_3$, $R_4$, as these are extremely small compared to the load reluctance.

Design of magnetic circuits according to the invention is comparatively simple, recognizing the optimum condition of minimum leakage (assume zero leakage) and sources matched to the load for maximum magnetic efficiency. With these assumptions, preliminary design often provides the final configuration, although minor variations can thereafter be made, either empirically or mathmatically, taking into account unavoidable but small residual leakage, any non-linear properties of the ferromagnetic sources and conductors, etc.

For the purpose of the analysis to follow, the additional parameters listed below are defined:

$A_0$ = area of primary magnet normal to flux
$A_1$ = area of auxiliary magnet normal to flux
$L_0$ = length (thickness) of primary magnet parallel to flux
$L_1$ = length (thickness) of auxiliary magnet parallel to flux
$F_g$ = mmf drop across air gap
$L_g$ = length of air gap parallel to flux
$A_g$ = area of air gap normal to flux
$\phi_0$ = flux in primary source loop
$\phi_1$ = flux in auxiliary source loop
$B_g$ = flux density at air gap Selecting the condition that each *mmf* source drives a parallel equal gap reluctance of area $A_g/2$ independently of the other, the load for each source is $2R_g$. (When each load of $2R_g$ is combined, the actual load $R_g$ is obtained.)

For maximum magnetic efficiency, the internal impedance of each magnetic source is matched to the load that it sees. Accordingly, in the example, the reluctances $R_0$, $R_1$, of the sources $F_0$ and $F_1$, are made equal to $2R_g$. Moreover, the mmf $F_0$ must be chosen to equal twice the gap mmf, or:

$$F_0 = 2F_g = 2\phi_0(2R_g). \tag{1}$$

The following relationships are also apparent:

$$\phi = \frac{B_g A_g}{2}; \tag{2}$$

$$R_g = \frac{L_g}{\mu A_g} \tag{3}$$

where $\mu = 1$ in air for the cgs unit dimentional system. Thus, $$F_0 = 2 \frac{(B_g A_g)}{2} \cdot 2 \frac{(L_g)}{A_g} \tag{4}$$

$$F_0 = 2 B_g L_g ;$$

Also:

$$F_0 = L_0 H_0 = L_1 H_1 \tag{5}$$

$$B_g L_g = \frac{L_0 H_0}{2} = \frac{L_1 H_1}{2}, \tag{6}$$

where $H_1$ and $H_0$ are the source field strengths.

If $R_m$ is the reluctance of a unit one-centimeter cube of magnetic material, then the reluctance of the magnetic sources is given by:

$$R_0 = \frac{R_{m0} L_0}{A_0}, R_1 = \frac{R_{m1} L_1}{A_1} \tag{7}$$

Since the flux $\phi_0$, $\phi_1$ contributed by the respective magnets is: $\phi = B_0 A_0$, $\phi_1 = B_1 A_1$, it can be seen that $$2 \phi_0 R_0 = F_0 = 2 B_g L_g ; \tag{8}$$

$$2 \phi_1 R_1 = F_0 = 2 B_g L_g \tag{9}$$

Substituting expressions (7) and (8) into expression (9) yields:

$$B_0 R_{mo} L_0 = B_1 R_{m1} L_1 = B_g L_g \qquad (10)$$

Therefore, from expressions (6) and (10):

$$B_0 R_{mo} = H_0/2$$
$$B_1 R_{m1} = H_1/2 \qquad (11)$$

The foregoing expressions (11) enable the determination of the operating point for any magnetic material.

Figure 7:
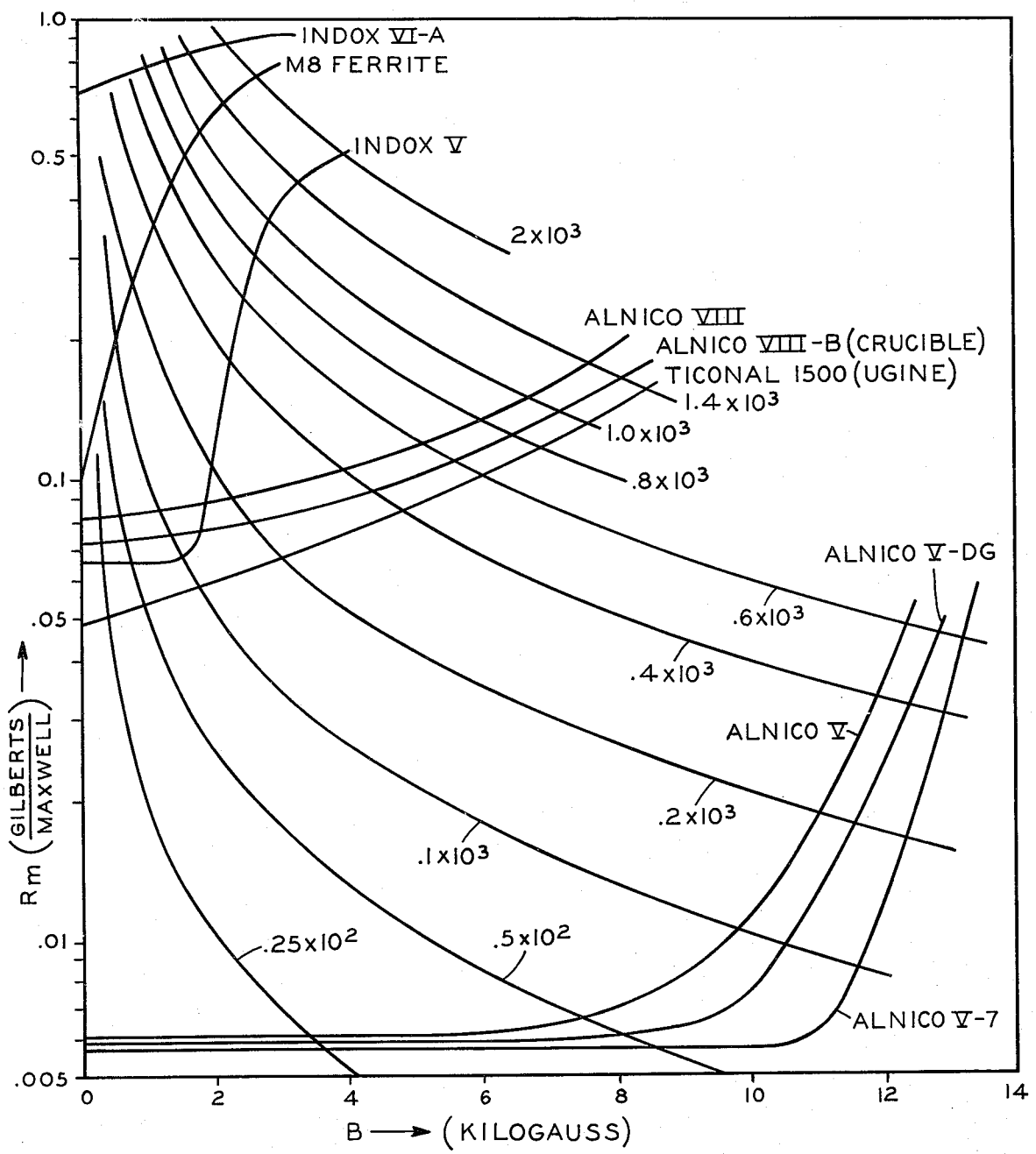
FIG. 7 is a graph showing the characteristics of typical magnetic materials and useful in explaining how magnetic circuits according to the invention may be designed.

FIG. 7 is a logarithmic plot of curves of constant magnetic field strengths $H_0$ against values of flux density and unit reluctance $R_m$. Also plotted are the unit reluctances of various magnetic materials at various flux densities. The field strength $H_0$ is known from the above computations, once the gap dimensions and flux requirements are chosen. Thus, FIG. 7 enables each magnetic source to be selected for operating point and formed to size according to expressions (7) for reluctance matching to the load, recalling that $R_0 = R_1 = 2R_g$ for the specific example above. It is apparent also that the above analysis can be carried out for more than one auxiliary source, it being required simply to determine the degree to which each auxiliary magnet should contribute to the total gap flux.

Figure 2:
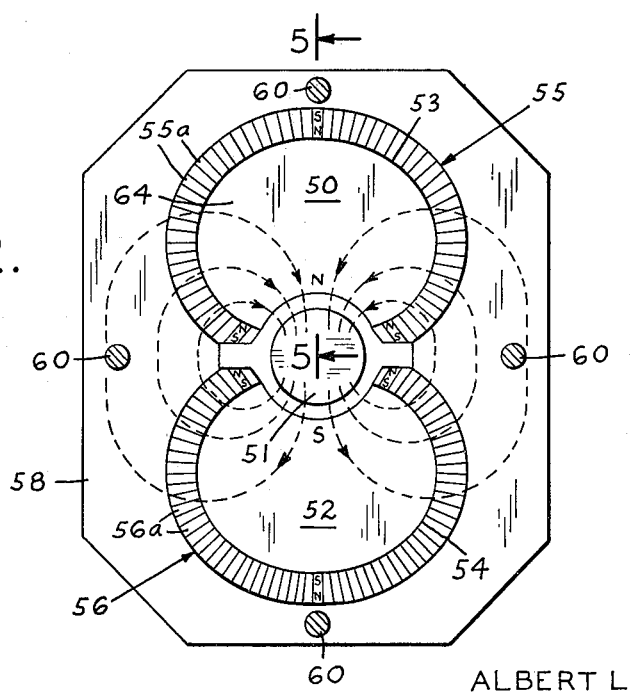
FIG. 2 is an elevational view of the structure of an alternate form of motor embodying the invention, using an arcuate arrangement of mmf source segments to achieve extremely efficient flux transfer and superior flux density at the air gap.

Returning now to the drawings, FIG. 2 is an improved motor configuration having a magnetic stator circuit geometry offering optimum elimination of flux losses.

Boardly speaking, this device utilizes a pole piece having an arcuate periphery and mmf sources providing independent, angularly related magnetic domains defining magnetic axes that intersect within the pole piece. Accordingly, the pole pieces 50, 52 have generally cylindrical sides 53, 54 that are substantially completely surrounded, or in this case, covered by mmf sources 55, 56. The pole pieces may be somewhat elliptical in cross-section, each having a radius from the motor axis as a minor axis and a major axis normal to the radius. The pole pieces may be perfectly circular, as well. Each of the mmf sources 55, 56 is, in turn, constituted of numerous closely adjacent individual magnetic segments 55a and 56a that have respective means polar axes generally normal to the rounded exterior surfaces 53, 54, of a respective pole piece. Each such axis preferably intersects with an axis of at least another segment, as can be observed from the schematic representation of FIG. 4. In general, the segments are arranged to counter any leakage flux that would otherwise emerge at that particular location.

Figure 4:
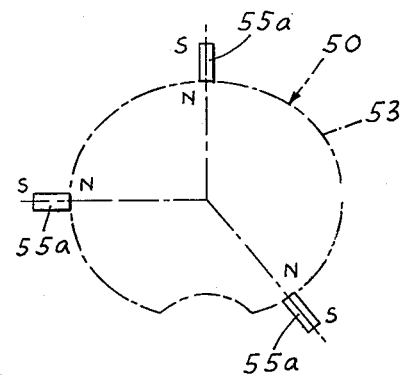
FIG. 4 is a schematic representation of the stator assembly of FIG. 2, illustrating the relationship of various magnetic axes.

In FIG. 4 the outline of the surface 53 of the generally round piece 50 is shown in phantom, with selected segments 55a indicated in solid lines to illustrate the geometric relationship of the mean polar axes of those segments. Polarities of the mmf source segments are arranged to be consistent along lines normal to the surfaces; thus, all north (N) poles face inward. As already noted, a circular or other arcuate pole geometry is equally feasible and might well be preferred in certain cases. An elliptical configuration tends to keep the dimensions of the unit smaller.

Returning to FIG. 2, the mmf source segments 55a and 56b are, in turn, generally completely surrounded by ferromagnetic housing material 58, which may be laminated or formed in sections to preclude eddy losses and secured together by shaft fasteners 60.

The arrangement of separate mmf source segments and flux return volume 58 is such to establish field lines that are naturally closed through the magnetic path segments including the rotor 51. This construction, accordingly, approximates the ideal case in which the mmf field is everywhere oriented to pass through the pole faces. It is noteworthy, in this regard, that the sources 55 could also comprise a cylindrical molded magnet in which the flux is generally everywhere normal to the magnet surface and there are, in essence, an infinite number of infinitesimally small segments each providing a separate magnetic field of individual direction along its polar axis.

Figure 5:
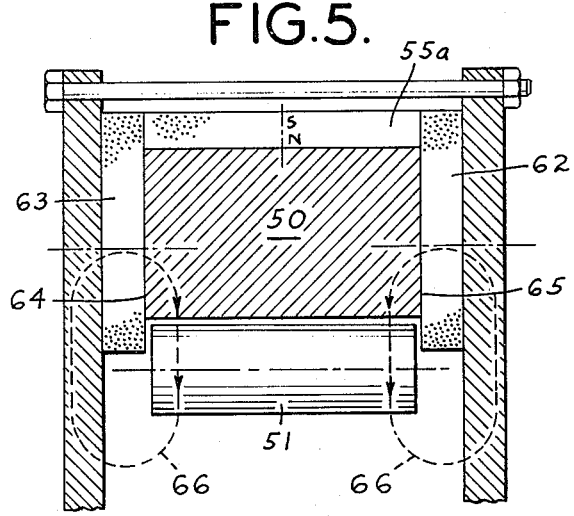
FIG. 5 is a simplified front elevation view in cross-section of the motor in FIG. 2, taken along the lines 5—5.

FIG. 5 illustrates a further improvement incorporated into the embodiment of FIG. 2. As shown, the pole pieces 50, 52 have their ends substantially entirely covered by end magnets 62, 63, of which the mean polar axes are generally normal to the external end surfaces 64, 65. The general outlines of the magnetic flux paths accounted for by the cross-field end magnets 62, 63 are depicted in FIG. 5 by the broken-line loops 66 traversing the rotor 51.

It is a particular feature of the invention that the flux density at the free surface (e.g., the pole face) can be made greater than the flux density at the main mmf source. By utilizing high strength auxiliary (cross-field) unit sources, for example, it is possible to bring the flux density to a value that exceeds the flux density of the primary source.

Another important feature is the capability of directing the flux selectively in a desired direction. This pertains also to the leakage flux, whereby the motor is effectively shielded from emergent stray magnetic fields by preventing flux loss from the pole pieces and by providing adequate flux return paths for the magnetic sources.

Figure 8:
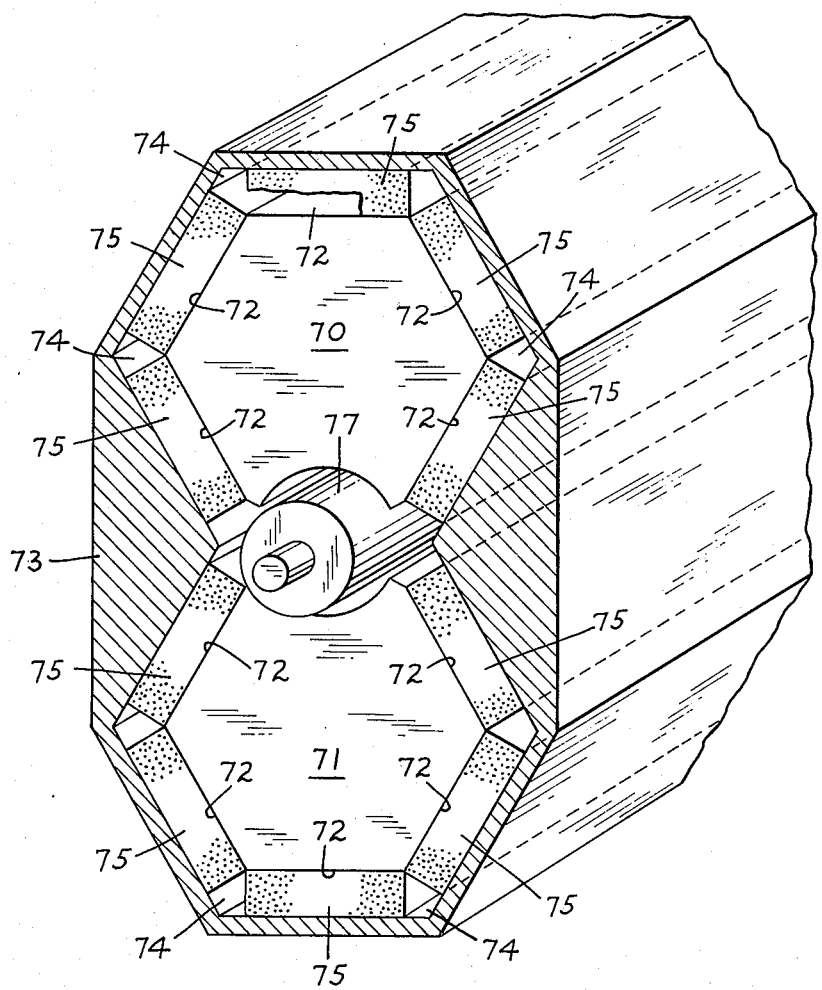
FIG. 8 is a partially cut-away perspective view of a further embodiment of an electric motor constructed according to the invention to achieve exceptional air gap flux density.

Referring now to FIG. 8, a further modification of the invention as applied to high flux motors may be seen. In general, this motor is similar to those of FIGS. 1 and 2, but implements polygonal pole pieces 70, 71 each having five flat faces 72 against which the *mmf* sources are placed. The outer motor housing 73 may be a unitary casting having an internal geometry configured to form a space 74 surrounding the pole pieces for receiving the mmf sources 75.

The flat faces 72 may be displaced around the pole piece at approximately 61° polar increments, measured from the longitudinal axis of the pole piece, with the free surface of the pole piece adjacent the rotor 77 subtending about a 55° angle.

The magnets 75 are selected for the desired strength per unit volume to obtain the design flux density at the air gap, and each is matched to its share of the load reluctance. For example, each magnetic slab 75 may have a reluctance equal to five times the gap reluctance $R_g$. The other feature of the motor of FIGS. 1 and 2, such as pole end magnets, can be incorporated into this motor, as well.

Figure 9:
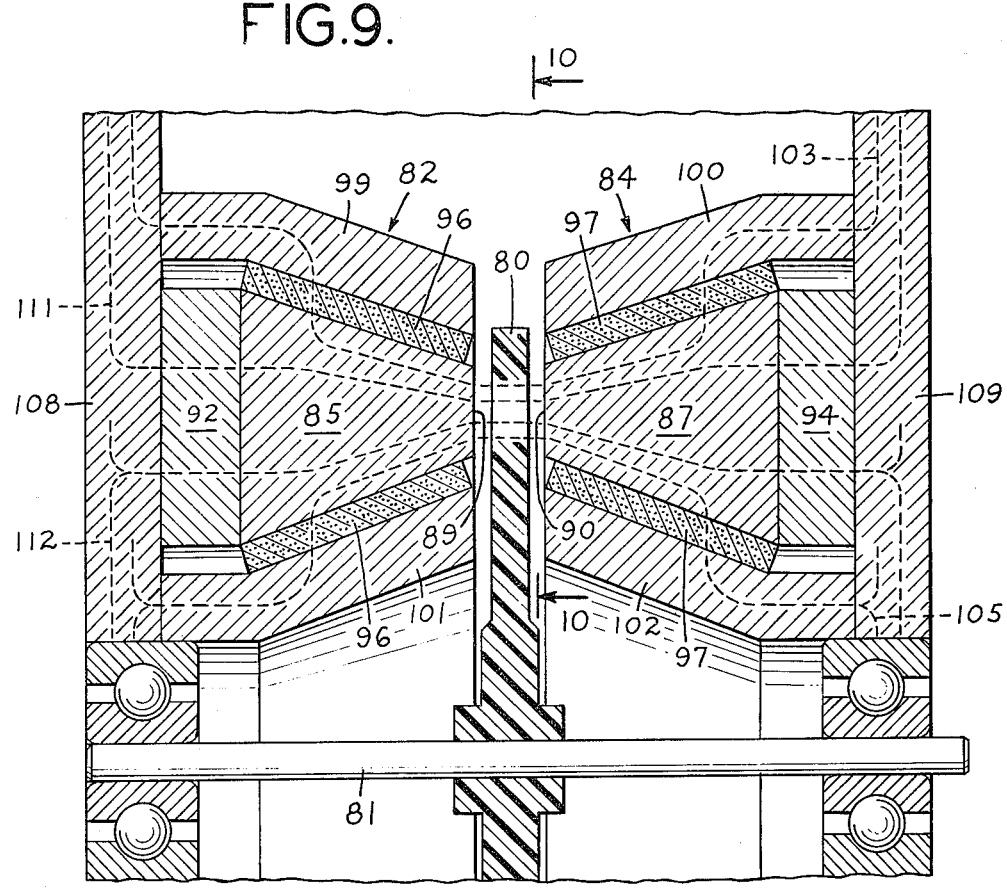
FIG. 9 is a side elevation view in cross-section of one pole pair of a disc armature type motor embodying the invention.
Figure 10:
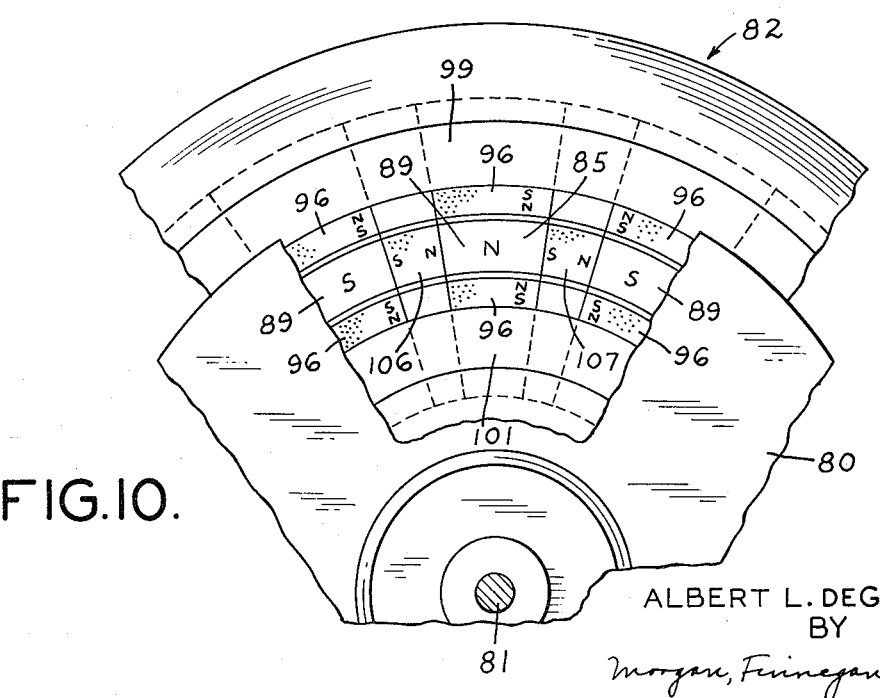
FIG. 10 is a partial, cut-away front elevational view of the pole shown in FIG. 9, taken along the lines 10—10.

FIGS. 9 and 10 depict an adaptation of the invention to a disc motor employing a disc type printed circuit armature 80 supported on a shaft 81 and opposed poles 82, 84 arranged on opposite sides of the disc circumferentially about the rotational axis to direct flux normal to the disc's planar surfaces. This motor may be of a type and construction similar to those described in U.S. Pat. Nos. 3,524,250 and 3,525,008 to R.P. Burr.

It should be understood that one of the poles 82, 84 could be replaced by suitable magnetically conducting material forming a flux return path for the flux from the pole opposite, if desired and depending upon the motor design. The rotor 80 may be assumed to be a low inertia printed circuit disc similar to those described in U.S. Pat. No. 3,488,339 to W.B. Tucker; for simplicity, the printed circuit conductors have not been depicted.

The primary elements of the improved magnetic circuit of the invention are readily identified from inspection. The pole pieces 85, 87 are convergent toward the poles faces 89, 90, and are excited by the main field magnets 92, 94 and the cross-field side magnets 96, 97. The shape of the poles is generally pyramidal, each having pairs of opposite sides convergent toward the disc rotor. Abutting the cross-field magnets are outer flux return rings 99, 100 and smaller flux return rings 101, 102 mounted on the housing plates, the latter conducting flux from all the mmf sources. These rings are annular members that are arranged concentrically at each side of the disc 80 to form an iron sheath for the poles. At the side surfaces of the pole pieces are cross-field magnets 106, 107 (FIG. 10). The rings 99-1-2 are in magnetic circuits 103, 105 (represented by dashed lines) with the cross-field magnets 96, 97 and the pole pieces as are the flux return plates 108, 109.

In principle, the same considerations apply to the embodiments of FIGS. 9 and 10 as to those earlier described. It is apparent that the pole pieces 85, 87 are essentially entirely covered by mmf sources on all sides except for the pole faces 89, 90 where nearly all flux lines cross. Thus, both the radially spaced and circumferentially spaced convergent sides of the pole pieces may be covered by permanent magnets with the circumferential spaced magnets being common to adjacent pole pieces. Typical flux paths 111, 112 for the main field magnets 92, 94 are shown by the dashed lines.

As is best appreciated from FIG. 10, adjacent poles alternate in magnetic polarity and, accordingly, the polar disposition of the mmf sources alternate, as well. For example, cross-field magnets have reverse N-S polar orientations in adjacent poles.

Figure 11:
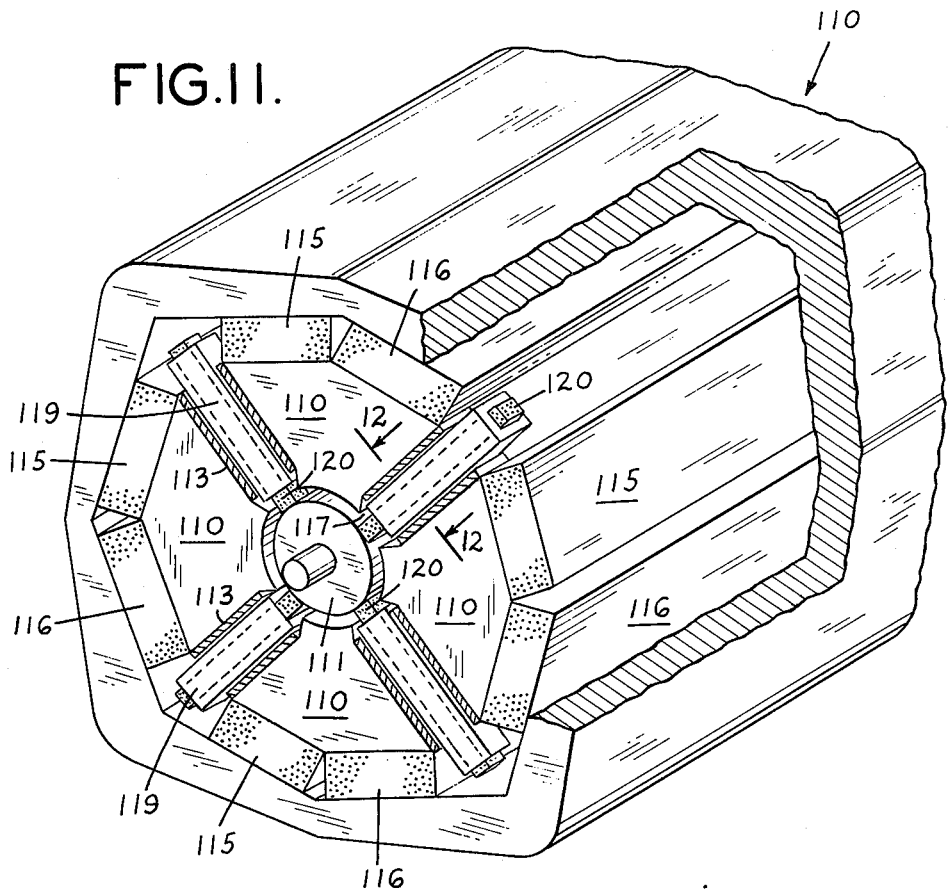
FIG. 11 is a partially cut-away perspective view of a portion of a four-pole motor embodying the principles of the invention.

FIG. 11 shows a typical four-pole hyper performance motor incorporating the features of the invention and capable of generating extremely high torques due to the powerful magnetic field emanating from each of the four pole pieces 110 and interacting with the rotor 111. An interesting feature of the particular motor illustrated is that a majority of the flux — perhaps two-thirds of the total flux — is contributed by the interpole magnets 113, the magnetic polar axis of each of which is generally normal to the adjacent side faces of the pole piece. Thus a minor portion of the flux is supplied by the two angularly related permanent magnets 115, 116 on the pole piece sides opposite the air gap 117. The angle between the sides covered by the sources 115, 116 is obtuse while the angle between those sides and the adjacent convergent sides is acute.

Figure 12:
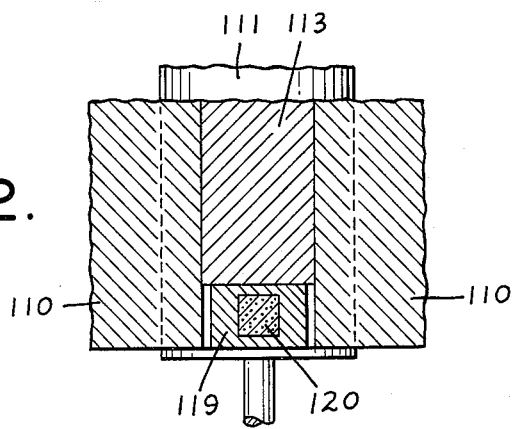
FIG. 12 is a cross-sectional view of a portion of the FIG. 11 structure, taken along the line 12—12.

The motor 110 of FIGS. 11 and 12 exhibits nearly all features of the invention, as the pole piece sides are substantially complete surrounded (covered) by magnetic sources, the magnetic polar axis of each source having a component normal to the resultant flux at the air gap, and the axes of the magnets 113, intersecting the magnetic axes of the other magnets 115, 116 internally of the pole piece 110. Furthermore, the interpole space has sufficient dimension to allow for brush holders 119, slidably supporting the brushes 120, to be received, thereby permitting the end bell of the motor to be located closely adjacent the ends of the pole pieces and rotor. This relationship is best appreciated from the cross-sectional view of FIG. 12. The motor housing 122, has internal surfaces conforming to the magnetic stator assembly and provides flux return paths for the magnetic circuits of the poles.

The invention thus provides a novel arrangement of elements in a magnetic circuit that has particularly advantageous application to electric motors and similar equipment in which magnetic flux densities of abnormally high values must be obtained. Not only does the invention enable the generation of magnified flux densities exceeding previously attainable values, it achieves this result in a novel and structurally simple manner. In addition, the invention has general usefulness in situations where efficient (albeit not necessarily large) flux transfer is desired. Thus, the efficiency of flux transfer from a main source of mmf may be bettered by incorporating low cost cross-field magnets of less stength and extraneous magnetic fields originating in the device may be greatly reduced or controlled.

Electric motors incorporating the invention have application to equipment capable of rapid start and stop operation, such as magnetic tape drives. Because the torque of the motor is directly related to the flux density, high acceleration and deceleration of substantial rotational loads may be achieved.

Although the invention has been described with reference to particular embodiments, many modifications and variations may be made within the skill of the art. For example, the invention should not be cnsidered limited to any particular geometry of magnetically conductive material used in conjunction with magnetic field sources and should not be considered limited to any particular application. Numerous magnetic materials may be used in combination with the invention, and permanent mmf sources can be employed singly or in combination. Accordingly, all such modifications and variations are intended to be included within the scope of the appended claims.

I claim:

1. A high flux electric motor, comprising:
    a rotor;
    at least one pair of polygonal pole pieces of magnetically permeable material each having at least four sides and a working air gap surface adjacent the rotor, at least two of said sides being disposed generally opposite the air gap surface and being related by an obtuse internal angle;
    a magnetomotive source covering each of the sides of said pole pieces, each said source associated with a respective pole piece being similarly poled and having a magnetic axis generally normal to the surface of the pole piece side covered thereby so as to oppositely pole the respective air gap surfaces; and
    a ferromagnetic motor casing contacting the magnetomotive sources and completing a magnetic flux circuit for each source through the pair of pole pieces and the rotor.

2. The high flux electric motor of claim 1, wherein: the area of the pole piece sides covered by the magnetomotive sources is at least 1.5 times the area of the air gap surface.

3. The high flux electric motor of claim 2, wherein: each pole piece has four sides including a pair of sides converging toward the air gap from said two sides opposite the air gap, and each of said convergent sides forming an acute internal angle with a respective one of said two sides.

4. The high flux electric motor of claim 3, further comprising:
   at least one additional pair of pole pieces of magnetically permeable material each configured substantially identically to said first pair of pole pieces;
   a magnetomotive source covering each side of the additional pair of pole pieces, each source being similarly poled and having magnetic axes generally normal to the pole piece sides covered thereby so as to oppositely pole the respective air gap surfaces of the additional pole pieces;
   the ferromagnetic motor casing contacting the magnetomotive sources associated with the additional pair of pole pieces so as to complete a magnetic flux circuit for each such source through the additional pair of pole pieces and the rotor.

5. The high flux electric motor of claim 2, wherein:
   each of the adjacent sides of the polygonal pole pieces is related by an obtuse internal angle.

6. The high flux electric motor of claim 2, wherein: each of the sides of the pole pieces is relatively narrow so as to form essentially a continuously curved pole piece surface everwhere covered by magnetomotive sources.

7. The high flux motor of claim 6, wherein each pole piece has a generally cylindrical exterior with a portion thereof constituting the air gap surface.

8. The high flux motor of claim 7, wherein each pole piece has a generally elliptical cross-section having a minor axis generally perpendicular to the air gap surface.

9. The high flux electric motor of claim 2, wherein:
   each of the magnetomotive sources comprises a permanent magnet having a magnetic axis generally normal to the pole piece surface covered thereby.

10. The high flux electric motor of claim 9, wherein:
    each of said permanent magnets has a magnetic reluctance approximating the reluctance of the magnetic load for the flux supplied thereby to the magnetic circuit.

* * * * *